(12) United States Patent
Moelard et al.

(10) Patent No.: US 8,054,771 B2
(45) Date of Patent: Nov. 8, 2011

(54) METHOD AND SYSTEM FOR ADDING A NEW CONNECTION IDENTIFIER TO AN EXISTING POWER SAVE CLASS

(75) Inventors: Henri Moelard, Maarssenbroek (NL); Floyd D. Simpson, Lake Worth, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 518 days.

(21) Appl. No.: 12/390,082

(22) Filed: Feb. 20, 2009

(65) Prior Publication Data

US 2010/0214967 A1 Aug. 26, 2010

(51) Int. Cl.
*H04W 52/00* (2009.01)
(52) U.S. Cl. .......................... 370/311; 455/574
(58) Field of Classification Search .................. None
See application file for complete search history.

(56) References Cited

U.S. PATENT DOCUMENTS

| 7,653,022 | B2 * | 1/2010 | Kang et al. | 370/328 |
|---|---|---|---|---|
| 2006/0240799 | A1 * | 10/2006 | Kim et al. | 455/343.2 |
| 2009/0042553 | A1 * | 2/2009 | Lavi | 455/419 |
| 2009/0137260 | A1 * | 5/2009 | Son | 455/466 |
| 2009/0209223 | A1 * | 8/2009 | Kone et al. | 455/343.1 |
| 2010/0002615 | A1 * | 1/2010 | Gupta | 370/311 |
| 2010/0091757 | A1 * | 4/2010 | Cheng et al. | 370/345 |

* cited by examiner

*Primary Examiner* — Min Jung

(57) ABSTRACT

A method (300) and system (200) for adding a connection identifier to an existing power saving class. The method can include the steps of—at a mobile unit (212) that is associated with at least one existing power saving class—generating (310) a type-length-value that specifies the identification of the existing power saving class, and integrating (312) the type-length-value into a dynamic service message request. The method can also include the step of transmitting (314) the dynamic service message request to a base station (210) such that the connection identifier will be automatically added to the existing power saving class without requiring deactivation or redefinition of the existing power saving class.

22 Claims, 2 Drawing Sheets

METHOD AND SYSTEM FOR ADDING A NEW CONNECTION IDENTIFIER TO AN EXISTING POWER SAVE CLASS

BACKGROUND OF THE INVENTION

1. Field of the Invention

The subject matter herein concerns the addition of a connection identifier to an existing power saving class and more particularly, the addition of such an identifier without interrupting a sleep mode availability scheme.

2. Description of the Related Art

In current communication systems that operate in accordance with IEEE standard 802.16e, a mobile unit may be associated with one or more power saving classes (PSC), although each mobile unit is typically associated with a single PSC. A PSC defines sleep and listening windows for the mobile unit assigned to the PSC. The time period that exists when no listening window exists for all the PSCs to which a particular mobile unit is associated is referred to as an unavailability window, assuming that all the connections of the mobile unit are associated with a PSC. Thus, the unavailability window represents a time when the mobile unit is in a sleep period for all of its associated PSCs. During the unavailability window, a base station may not transmit to the mobile unit, which permits the mobile unit to power down certain components or perform other activities that do not require communication with the base station. The unavailability window is important in mobile communications because it permits the mobile unit to conserve battery power and allows for co-existence schemes with other radio technologies for avoiding interference.

As is known in the art, when a mobile unit is associated with a PSC, all the connection identifiers (CID) of that mobile unit are assigned to the PSC. Eventually, the mobile unit may wish to have a new service flow activated. Because the existing PSC will not contain the CID of the new service flow, this PSC will need to be deactivated, re-defined to include the new CID and then reactivated. This process is illustrated in the flow diagram of FIG. 1. In this drawing, signals originating from the left are sent from a mobile, while signals emanating from the right are transmitted from the serving base station. In addition, the shaded areas represent unavailability windows (see explanation above) and the lighter regions signify availability windows, or time periods where it may be possible for the mobile unit and the base station to exchange signals. In this scenario, it can be assumed that the mobile unit is associated with a single PSC and wishes to initiate a new service flow.

Initially, the mobile unit transmits a dynamic service addition request (DSA-REQ) to the base station during an availability window or interval. The base station responds by transmitting—during the next availability window—a dynamic service addition response (DSA-RSP) to the mobile unit, which leads to the activation of the new CID, assuming that the base station accepts the DSA-REQ. The mobile unit will then respond with a dynamic service addition acknowledgement (DSA-ACK).

As noted earlier, the existing PSC with which the mobile is currently associated will not contain the new CID. As such, the mobile unit will transmit a sleep request (SLP-REQ) to the base station, which will cause the base station to deactivate the current PSC and respond with a sleep response (SLP-RSP) to the mobile unit. The mobile unit will then transmit another SLP-REQ to the base station, which will define the parameters for the new PSC to accommodate the new CID. In response, the base station will activate the new PSC, which includes the new CID, and will transmit another SLP-RSP to the mobile unit. This SLP-RSP will also specify the start frame for the next sleeping period (i.e., unavailability window). As can be seen, the time before the mobile unit enters the next unavailability window is relatively lengthy. This additional time, however, is necessary because it allows the base station to re-transmit the SLP-RSP if there is a problem with its initial transmission and it permits the base station to perform synchronization procedures, like synchronizing all or some listening periods for multiple PSCs.

It can be clearly seen that there is a substantial amount of overhead and time involved when a mobile unit wishes to activate a new service flow. Because the current PSC must be deactivated, re-defined and reactivated, the mobile unit may not enter sleep mode during this process. Accordingly, this process negatively affects battery life. Moreover, the abundance of messages being exchanged leads to an inefficient use of network resources.

SUMMARY OF THE INVENTION

A method and system for adding a connection identifier to an existing PSC is described herein. The method can include the steps of—at a mobile unit that is associated with at least one existing PSC—generating a type-length-value (TLV) that specifies the identification of the existing PSC and integrating the TLV into a dynamic service message request. The method can also include the step of transmitting the dynamic service message request to a base station such that the CID will be automatically added to the existing PSC without requiring deactivation or redefinition of the existing PSC.

As an example, the dynamic service message request may activate a service flow. As another example, the dynamic service message request can be a DSA-REQ that is for creating a new service flow or a dynamic service change request (DSC-REQ) for dynamically changing an existing service flow. The method can further include the step of receiving a dynamic service message response from the base station in response to the transmission of the dynamic service message request. In one arrangement, the dynamic service message request may activate a service flow, and the dynamic service message response can include the CID. In another arrangement, the TLV is integrated into the dynamic service message request only when the dynamic service message request activates a service flow. In addition, the mobile unit may operate in accordance with IEEE standard 802.16e.

A mobile unit is also described herein in which the mobile unit is associated with an existing PSC. The mobile unit may include a transceiver for exchanging wireless signals with a base station and may also include a processor in which the transceiver can be coupled to the processor. The processor can be operable to—in response to a request to activate a service flow—generate a tag that identifies the existing PSC as the PSC to which a CID of the service flow should be added and integrate the tag with a dynamic service protocol message. In addition, the transceiver may transmit the dynamic service protocol message to the base station such that the CID will be added to the existing PSC without the existing PSC having to be redefined.

As an example, the dynamic service protocol message may activate the service flow, and the tag can be a TLV of the dynamic service protocol message. Additionally, the dynamic service protocol message can be a DSA-REQ for creating a new service flow or a DSC-REQ for changing an existing service flow. In one arrangement, the CID can be immediately added to the existing PSC when the service flow is activated, and the dynamic service protocol can include an active quality of service parameter set. The mobile unit and the base station may also operate in accordance with IEEE standard 802.16e. The processor of the mobile unit can also be operable to receive a dynamic service response from the base station in response to the transmission of the dynamic service protocol with the tag, and the dynamic service response can include the CID.

Another method of adding a CID to an existing PSC is described herein. This method can include the step of receiving a dynamic service message from a mobile unit that is associated with an existing PSC in which the dynamic service message includes a TLV generated by the mobile unit, and the TLV can contain the identification of the existing PSC. The method also can include the steps of generating a CID for a service flow that is associated with the dynamic service message and adding the CID to the existing PSC once the service flow is activated without redefining the existing PSC.

The method can further include the step of transmitting a dynamic service response message to the mobile unit that includes the CID for the activated service flow. In one embodiment, the dynamic service message from the mobile unit may activate the service flow, and the dynamic service message can be a DSA-REQ or a DSC-REQ.

A base station in which the base station communicates with a mobile unit that is associated with at least one existing PSC is also described herein. The base station can include a transceiver that exchanges wireless signals with the mobile unit and can further include a management module in which the management module can be coupled to the transceiver. The management module can be operable to receive a dynamic service message from the transceiver that can be generated by the mobile unit in which the dynamic service message includes a tag that specifies the identification of the existing PSC. The management module can also be operable to generate a CID for a service flow that is associated with the dynamic service message and following the activation of the service flow, add the CID to the existing PSC without deactivating or re-defining the existing PSC. As an example, the dynamic service message may activate the service flow, and the dynamic service message can be a DSA-REQ or a DSC-REQ.

BRIEF DESCRIPTION OF THE DRAWINGS

Features that are believed to be novel are set forth with particularity in the appended claims. The claimed subject matter may best be understood by reference to the following description, taken in conjunction with the accompanying drawings, in the several figures of which like reference numerals identify like elements, and in which:

DETAILED DESCRIPTION

Figure 1:
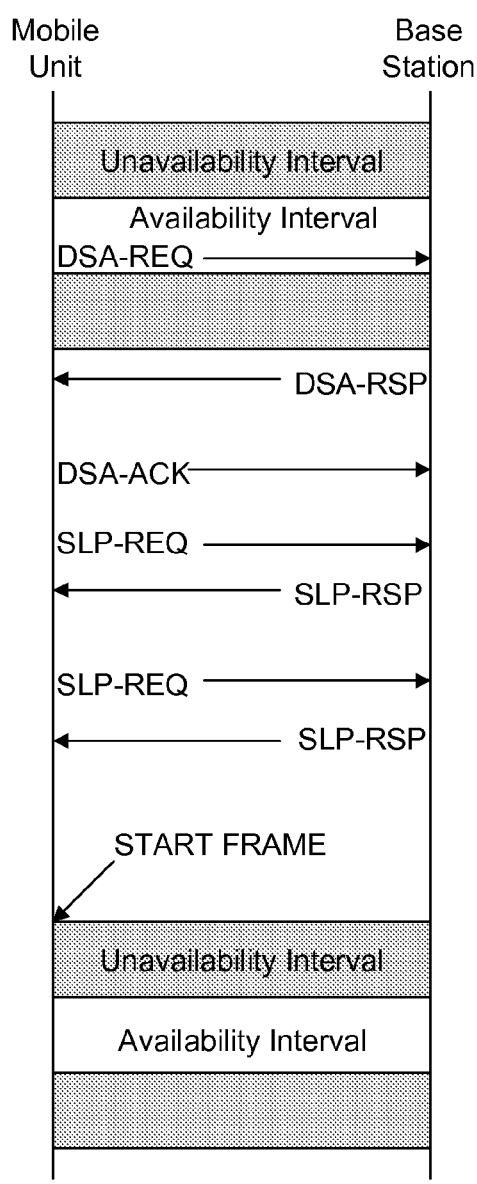
FIG. 1 illustrates an existing service flow activation process.

As required, detailed embodiments of the claimed subject matter are disclosed herein; however, it is to be understood that the disclosed embodiments are merely exemplary and can be embodied in various forms. Therefore, specific structural and functional details disclosed herein are not to be interpreted as limiting, but merely as a basis for the claims and as a representative basis for teaching one skilled in the art to variously employ the claimed subject matter in virtually any appropriately detailed structure. Further, the terms and phrases used herein are not intended to be limiting but rather to provide an understandable description.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The terms "coupled" or "communicatively coupled" as used herein are defined as connected, although not necessarily directly, and not necessarily mechanically.

The term "transceiver" can be defined as any component or group of components that is capable of receiving and/or transmitting communications signals. The term "processor" can mean any component or group of components, including any suitable combination of hardware and software, that is capable of carrying out any of the processes described herein. The term "mobile unit" can mean any portable communication unit capable of receiving or transmitting communication signals. The term "base station" can mean any generalized equipment set that can provide connectivity, management or control of a mobile unit. A "type-length-value" is defined as a piece of information added to a transmitted parameter that contains the parameter type (and implicitly its encoding rules) and the length of the encoded parameter. A "tag" can be defined as any piece of information that can be used to identify a PSC.

A "connection identifier" is defined as a value that identifies a transport connection or an uplink/downlink pair of associated management connections to equivalent peers in the medium access control (MAC) layer of a base station and an associated mobile unit. The term "power saving class" is defined as any scheme that contains any number of parameters for setting sleep windows and listening windows for an associated mobile unit. An "existing power saving class" is defined as any PSC that has already been defined and activated at the time a service flow has been provisioned, admitted or activated. A "service flow" means a unidirectional flow of MAC layer service data units on a connection that is provided a particular quality of service (QoS), and the term "integrate" or "integrating" can mean to add to or to combine with. The term "management module" means any component or group of components, including any suitable combination of hardware and software, that is capable of carrying out any of the processes described herein. The term "deactivate" or "deactivation" means to render inactive or to tear down an existing object or set of parameters for an object, and the term "redefine" or "redefining" means to give a new or different set of parameters for an existing object. The term "generate" or "generating" means to bring into existence or to produce and includes the retrieval of an object, program, code or set of information contained within a database or memory.

The subject matter in this document refers to a method and system for adding a CID to an existing PSC. The method can include the steps of—at a mobile unit that is associated with at least one existing PSC—generating a TLV that specifies the identification of the existing PSC and integrating the TLV into a dynamic service message request. The method can also include the step of transmitting the dynamic service message request to a base station such that the connection identifier will be automatically added to the existing PSC without requiring deactivation or redefinition of the existing power saving class. As such, the number of messages required to be exchanged between the mobile unit and the base station is reduced, and the mobile unit can enter sleep mode much faster than in previous schemes.

Figure 2:
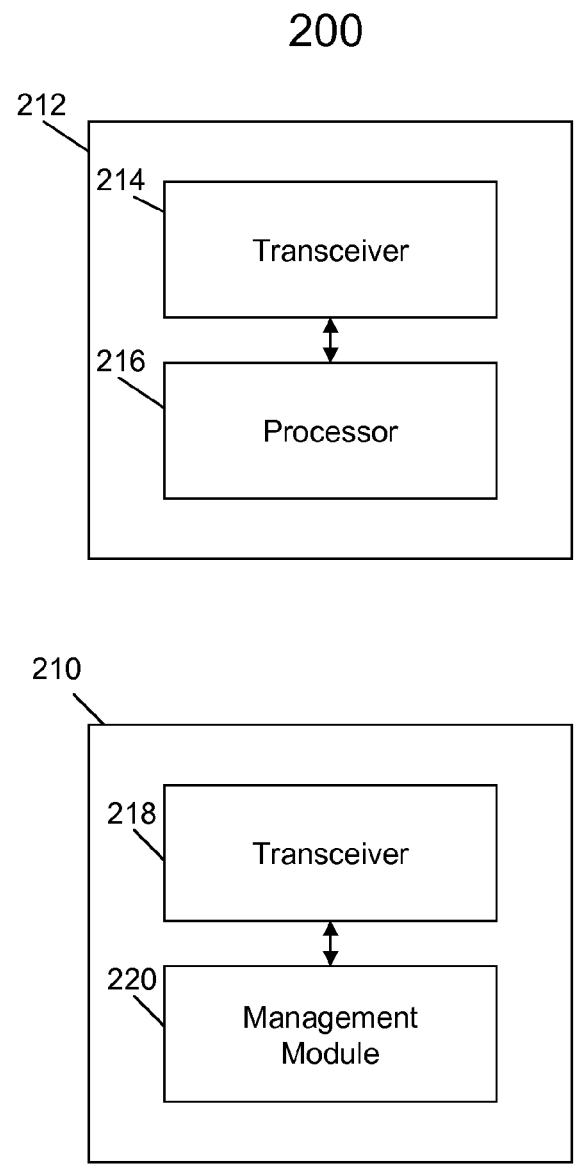
FIG. 2 illustrates an example of a system for adding a CID to an existing PSC.

Referring to FIG. 2, a system 200 for adding a CID to an existing PSC is shown. In one embodiment, the system 200 can include a base station 210 and one or more mobile units 212 in which the base station 210 can be considered a serving base station to the mobile units 212. As an example, the mobile unit 212 may include a transceiver 214 and a processor 216 that can be coupled to the transceiver 214. In addition, the base station 210 may include a transceiver 218 and a management module 220 that can be coupled to the transceiver 218. The transceiver 214 of the mobile unit 212 exchanges wireless signals with the transceiver 218 of the base station 210, and in one arrangement, both the mobile unit 212 and the base station 210 operate in accordance with IEEE standard 802.16e. It is noted, however, that these components are not so limited, as they may operate in accordance with other suitable wireless communication standards.

Figure 3:
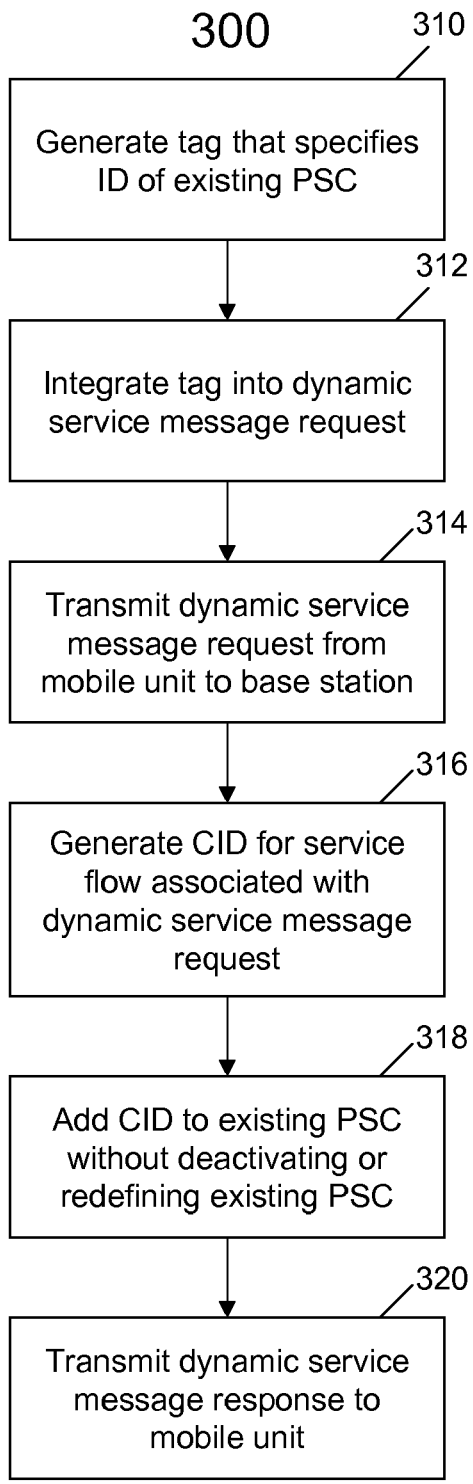
FIG. 3 illustrates an example of a method for adding a CID to an existing PSC and FIG. 4 illustrates a flow diagram that is related to the method of FIG. 3.

Turning to FIG. 3, a method 300 of adding a CID to an existing PSC is shown. To describe this method 300, reference will be made to FIG. 2, although it is understood that the method 300 can be practiced in any other suitable system using any other suitable components. Moreover, the steps of the method 300 are not limited to the particular order in which they are presented in the figure. Also, the method 300 can have a greater number of steps or a fewer number of steps than those shown in the figure.

At step 310, a tag can be generated that specifies the identification of an existing PSC. For example, the mobile unit 212 may be currently assigned to the base station 210 and as part of this configuration, the mobile unit 212 may be associated with one or more PSCs, which may be referred to as existing PSCs. As an example, the mobile unit 212 may wish to create a new service flow or to change an existing service flow. As such, the processor 216 of the mobile unit 212 may generate a tag that identifies an existing PSC with which the mobile unit 212 is associated. In one arrangement, the tag can be a TLV that specifies this information.

At step 312, the tag can be integrated into a dynamic service message request. For example, the processor 216 of the mobile unit 212 may integrate the tag, or TLV, into a dynamic service addition request (DSA-REQ), which can be a request to create a new service flow. As another example, the processor 216 may integrate the TLV into a dynamic service change request (DSC-REQ), which can be used to dynamically change an existing service flow. Those skilled in the art, however, will appreciate that the tag or TLV may be integrated with any other suitable dynamic service message. In fact, the terms "dynamic service message" or "dynamic service protocol message" are defined as any request to create, alter, modify or even delete a service flow.

Referring back to the method 300, the dynamic service message request can be transmitted from the mobile unit to a base station, as shown at step 314. At step 316, the receiving base station can generate a CID for the service flow that is associated with the dynamic service message request. At step 318, the base station can add the CID to the existing PSC without deactivating or redefining the existing PSC.

For example, the transceiver 214 of the mobile unit 212 can transmit the dynamic service message to the transceiver 218 of the base station 210. Once received, the transceiver 218 can forward the message to the management module 220, which can process the dynamic service message. In particular, the management module 220 can determine the identification of the existing PSC from the TLV and can also determine whether the dynamic service message is configured to activate its associated service flow. In one arrangement, if the dynamic service message is intended to activate the service flow, the management module 220 may generate the CID for the service flow and add the CID to the existing PSC. In this case, the dynamic service message can contain an active QoS parameter set. In one particular embodiment, the CID may be immediately added to the existing PSC when the service flow is activated. It must be noted, however, that the tag or TLV specifying the identification of the existing PSC may be embedded in a dynamic service message request that merely places the service flow in a provisioned or admitted state, if so desired. In either arrangement, because the dynamic service message request includes the identification of the existing PSC for association with the service flow, the management module 220 is not required to deactivate or redefine any PSCs.

Referring back to the method 300, at step 320, the base station, in response to the receipt of the dynamic service message request, can transmit a dynamic service message response to the mobile unit. For example, the management module 220 of the base station 210 can generate a dynamic service addition response (DSA-RSP) or a dynamic service change response (DSC-RSP) and can instruct the transceiver 218 to forward it to the mobile unit 212. In one arrangement, if the service flow has been activated or admitted, the dynamic service message response can include the CID. Alternatively, if the service flow has been merely provisioned, the dynamic service message response may include the service flow identifier (SFID). The mobile unit 212 may then respond with an acknowledgement to the dynamic service message response, such as a dynamic service addition acknowledgement (DSA-ACK) or a dynamic service change acknowledgement (DSC-ACK).

Figure 4:
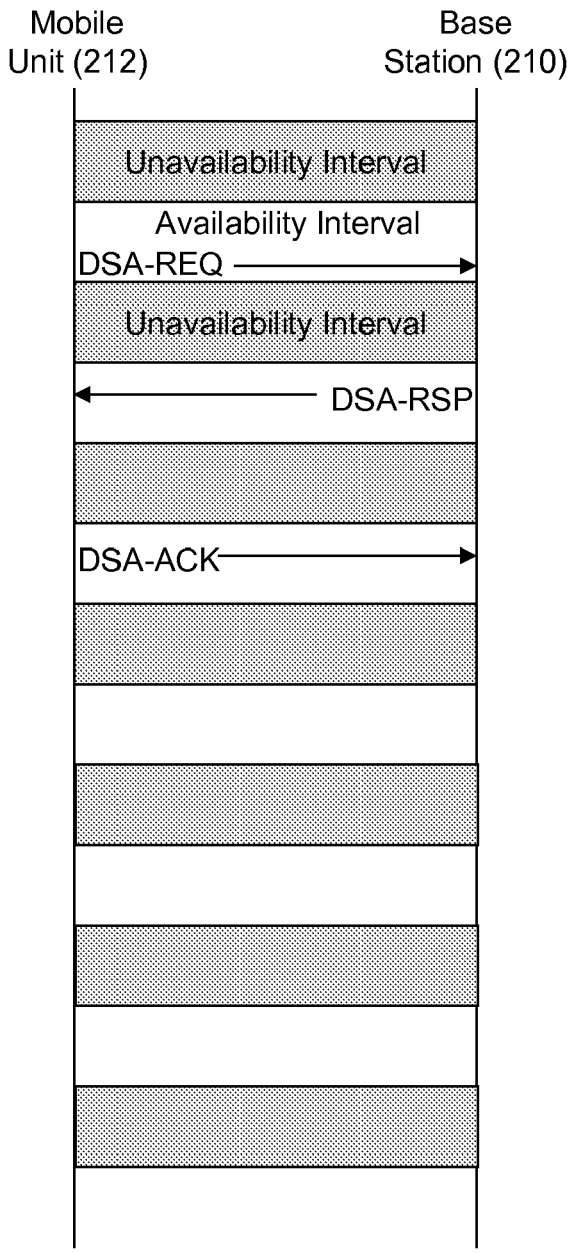

As noted above, this process eliminates the need for PSC deactivation or redefinition. Accordingly, the existing sleep window scheme may continue. An example of this result is demonstrated in FIG. 4, which shows a flow diagram between the mobile unit 212 (on the left) and the base station 210 (on the right). Here, the shaded areas represent unavailability or sleep windows (no messages exchanged between mobile unit 212 and base station 210), while the unshaded regions refer to active or availability intervals (messages can be exchanged between the mobile unit 212 and the base station 210). In the first availability interval, the mobile unit 212 may transmit, for example, a DSA-REQ, which may be configured to activate a service flow and can include the TLV specifying the identity of an existing PSC. At the next availability window, the base station 210 may transmit the DSA-RSP, which includes the CID for the activated service flow. The mobile unit 212 may also transmit a DSA-ACK at the next availability interval. As can be seen, because the deactivation and redefinition of the PSC is no longer necessary, including the inherent exchange of sleep request and sleep response messages, the mobile unit 212 may remain on its existing sleep schedule. That is, there are no changes to the current schedule of unavailability intervals.

The examples described above present the case where the dynamic service message request is initiated by the mobile unit 212. It may be desirable to have the base station 210 initiate such a request. In that scenario, the base station 210 may simply transmit the dynamic service message request, which can include the tag or TLV identifying the existing PSC and the CID that has been added to the existing PSC, to the mobile unit 212. The mobile unit 212 may then signal the base station 210 with a dynamic service message response.

While the various embodiments of the present invention have been illustrated and described, it will be clear that the claimed subject matter is not so limited. Numerous modifications, changes, variations, substitutions and equivalents will occur to those skilled in the art without departing from the spirit and scope of the present invention as defined by the appended claims.

What is claimed is:

1. A method of adding a connection identifier to an existing power saving class, comprising:
at a mobile unit that is associated with at least one existing power saving class, generating a type-length-value that specifies the identification of the existing power saving class;
integrating the type-length-value into a dynamic service message request associated with a new service flow; and
transmitting the dynamic service message request to a base station such that the connection identifier associated with a new service flow will be generated by the base station and automatically added to the existing power saving class without requiring deactivation or redefinition of the existing power saving class.

2. The method according to claim 1, wherein the dynamic service message request activates the new service flow.

3. The method according to claim 1, wherein the dynamic service message request is a dynamic service addition request that is for creating a new service flow.

4. The method according to claim 1, further comprising receiving a dynamic service message response from the base station in response to the transmission of the dynamic service message request.

5. The method according to claim 4, wherein the dynamic service message response includes the connection identifier.

6. The method according to claim 1, wherein the type-length-value is integrated into the dynamic service message request only when the dynamic service message request activates a service flow.

7. The method according to claim 1, wherein the mobile unit operates in accordance with Institute of Electrical and Electronics Engineers standard 802.16e.

8. A mobile unit, wherein the mobile unit is associated with an existing power saving class, comprising:
a transceiver for exchanging wireless signals with a base station; and
a processor, wherein the transceiver is coupled to the processor and the processor is operable to:
in response to a request to activate a service flow, generate a tag that identifies the existing power saving class as the power saving class to which a connection identifier of the service flow should be added; and
integrate the tag with a dynamic service protocol message;
wherein the transceiver transmits the dynamic service protocol message to the base station such that the connection identifier will be generated by the base station and the connection identifier will be added to the existing power saving class without the existing power saving class having to be redefined.

9. The mobile unit according to claim 8, wherein the dynamic service protocol message activates the service flow.

10. The mobile unit according to claim 8, wherein the tag is a type-length-value of the dynamic service protocol message.

11. The mobile unit according to claim 8, wherein the dynamic service protocol message is a dynamic service addition request for creating a new service flow.

12. The mobile unit according to claim 8, wherein the mobile unit and the base station operate in accordance with Institute of Electrical and Electronics Engineers standard 802.16e.

13. The mobile unit according to claim 8, wherein the connection identifier is immediately added to the existing power saving class when the service flow is activated.

14. The mobile unit according to claim 8, wherein the dynamic service protocol includes an active quality of service parameter set.

15. The mobile unit according to claim 8, wherein the processor is further operable to receive a dynamic service response from the base station in response to the transmission of the dynamic service protocol with the tag and the dynamic service response includes the connection identifier.

16. A method of adding a connection identifier to an existing power saving class, comprising:
receiving a dynamic service message associated with a new service flow from a mobile unit that is associated with an existing power saving class, wherein the dynamic service message includes a type-length-value generated by the mobile unit and the type-length-value contains the identification of the existing power saving class;
generating a connection identifier for the new service flow that is associated with the dynamic service message; and
adding the connection identifier to the existing power saving class once the service flow is activated without redefining the existing power saving class.

17. The method according to claim 16, further comprising transmitting a dynamic service response message to the mobile unit that includes the connection identifier for the activated service flow.

18. The method according to claim 16, wherein the dynamic service message from the mobile unit activates the service flow.

19. The method according to claim 16, the dynamic service message is a dynamic service addition request or a dynamic service change request.

20. A base station, wherein the base station communicates with a mobile unit that is associated with at least one existing power saving class, comprising:
a transceiver that exchanges wireless signals with the mobile unit; and
a management module, wherein the management module is coupled to the transceiver and is operable to:
receive a dynamic service message associated with a new service flow from the transceiver that is generated by the mobile unit, wherein the dynamic service message includes a tag that specifies the identification of the existing power saving class;
generate a connection identifier for the new service flow that is associated with the dynamic service message; and
following the activation of the service flow, add the connection identifier to the existing power saving class without deactivating or re-defining the existing power saving class.

21. The base station according to claim 20, wherein the dynamic service message activates the service flow.

22. The base station according to claim 20, wherein the dynamic service message is a dynamic service addition request or a dynamic service change request.

* * * * *